US007695556B2

(12) United States Patent  
Johnson et al.

(10) Patent No.: US 7,695,556 B2  
(45) Date of Patent: Apr. 13, 2010

(54) INK FOR PRINTING DATA CARRYING MARK ON HONEYCOMB STRUCTURES

(75) Inventors: L Urdenis Johnson, Tyrone, PA (US); Lisa Ann Lamberson, Painted Post, NY (US); Robert Michael Morena, Caton, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/732,013

(22) Filed: Apr. 2, 2007

(65) Prior Publication Data

US 2008/0053333 A1 Mar. 6, 2008

Related U.S. Application Data

(60) Provisional application No. 60/841,074, filed on Aug. 30, 2006.

(51) Int. Cl.  
*C09D 11/00* (2006.01)  
*C03C 8/14* (2006.01)  
*C03C 8/16* (2006.01)

(52) U.S. Cl. .................. 106/31.9; 106/31.13; 106/31.6; 106/31.65; 501/17; 501/20

(58) Field of Classification Search .................. 501/17, 501/14, 15, 16, 18, 19, 20, 21; 65/33.6; 106/31.13, 106/31.6, 31.65, 31.9  
See application file for complete search history.

(56) References Cited

U.S. PATENT DOCUMENTS 4,369,254 A * 1/1983 Prabhu et al. .................. 501/21

(Continued)

FOREIGN PATENT DOCUMENTS

CA 1333813 * 1/1995

(Continued)

OTHER PUBLICATIONS

Reynolds and Reynolds Introduces New Parts Barcoding Inventory Management Solution http://license.icopyright.net/user/viewFreeUSe.act?fuid=MTE4MzE0Mg%3D%3D.

Primary Examiner—Karl E Group  
Assistant Examiner—Noah S Wiese  
(74) Attorney, Agent, or Firm—Joseph M. Homa (57) ABSTRACT

A system, method, and ink for printing a data carrying mark on a green ceramic honeycomb structure is provided. The system includes a printer having an ink jet print head that prints a mark, preferably in the form of a two-dimensional data matrix barcode, on a side wall of the green ceramic honeycomb structure. The ink may be a heat resistant ink that comprises a mixture of a glass or glass ceramic frit and a metal oxide colorant. An optical reader is provided for determining if the data is accurately reproduced in the printed mark, as well as any noise factor which may be present due to defective printing. The system includes a turntable that positions the green body for the printing operation, and then rotates the green body to position the printed mark first in front of a dryer, and then in front of the optical reader to determine the quality of the mark. Marked green and ceramic honeycombs are also provided as well as a method for repairing a defective applied bar code on a honeycomb structure.

26 Claims, 5 Drawing Sheets

U.S. PATENT DOCUMENTS

| | | | |
|---|---|---|---|
| 4,717,690 A * | 1/1988 | Hankey et al. | 501/20 |
| 4,788,163 A * | 11/1988 | Hang et al. | 501/17 |
| 4,859,637 A | 8/1989 | Roberts | 501/79 |
| 4,871,621 A | 10/1989 | Bagley et al. | |
| 5,855,969 A | 1/1999 | Robertson | 427/555 |
| 6,043,171 A | 3/2000 | Siebers et al. | 501/66 |
| 6,238,847 B1 | 5/2001 | Axtell, III et al. | 430/322 |
| 6,357,868 B1 * | 3/2002 | Pfaff et al. | 347/99 |
| 6,402,823 B1 * | 6/2002 | Garcia Sainz et al. | 106/31.95 |
| 6,753,089 B2 | 6/2004 | Bryden | 428/446 |
| 6,905,990 B2 * | 6/2005 | Sanichi et al. | 501/32 |
| 6,948,243 B2 | 9/2005 | Ichikawa et al. | 29/890 |
| 2003/0162646 A1 * | 8/2003 | Kawamura et al. | 501/21 |
| 2004/0029700 A1 | 2/2004 | Kato et al. | 501/16 |
| 2004/0071942 A1 | 4/2004 | Schultheis | |
| 2006/0073970 A1 | 4/2006 | Yamada | 502/439 |
| 2006/0269722 A1 | 11/2006 | Yamada | 428/116 |

FOREIGN PATENT DOCUMENTS

| | | |
|---|---|---|
| DE | 296 01 443 U1 | 5/1996 |
| EP | 0 362 136 | 9/1986 |
| EP | 0 202 902 A1 | 11/1986 |
| EP | 0 321 297 A1 | 6/1989 |
| EP | 0 680 940 | 11/1995 |
| EP | 1 106 589 | 6/2001 |
| EP | 1 270 241 A2 | 1/2003 |
| EP | 1 334 795 | 8/2003 |
| EP | 1 533 032 | 5/2005 |
| EP | 1 586 547 | 10/2005 |
| GB | 2 086 368 | 5/1982 |
| SU | 1167173 A * | 7/1985 |
| WO | 0063136 A1 | 10/2000 |
| WO | 2007/078378 | 7/2007 |

* cited by examiner

INK FOR PRINTING DATA CARRYING MARK ON HONEYCOMB STRUCTURES

RELATED INVENTIONS

This invention claims priority to, and the benefit of, U.S. Provisional Application No. 60/841,074 filed Aug. 30, 2006 and entitled "System And Method For Printing A Data Carrying Mark On A Ceramic Structure."

FIELD OF THE INVENTION

This invention generally relates to marking of ceramic structures, and is specifically concerned with systems and methods for printing a data-carrying mark on a honeycomb structure, and marked honeycomb structures produced thereby.

BACKGROUND OF THE INVENTION

Ceramic honeycomb structures are widely used as anti-pollutant devices in the exhaust systems of automotive vehicles, both as catalytic converter substrates in automobiles, and diesel particulate filters in diesel-powered vehicles. In both applications, the ceramic honeycomb structures are formed from a matrix of relatively thin ceramic webs which define a plurality of parallel, gas conducting channels. In honeycomb structures used as ceramic catalytic substrates, the cell density may be as high as about 900 cells per square inch. To reduce the pressure drop that the exhaust gases create when flowing through the honeycomb structure, the web walls are rendered quite thin, i.e. on the order 2-6 mils. Ceramic honeycomb structures used as diesel particulate filters generally have a lower cell density of between about 100 and 400 cells per square inch, and are formed from webs on the order of 12-25 mils thick. In both cases, the matrix of cells is preferably surrounded by an outer skin.

Such ceramic honeycomb structures may be formed by an extrusion technique in which an extruded body is cut into segments that form green ceramic bodies. After drying, these honeycomb green bodies are fired at temperatures of at least 1100° C. or higher, and typically 1300° C. or higher in order to sinter the batch constituent particles present in the extruded material into a finished ceramic honeycomb structure. The finished fired honeycomb bodies may be subjected to additional heating steps in which they are fired again to a lower temperatures, for example, on the order of 800° C. or more. The finished ceramic structures may also be subjected to a coating process that coats the gas contacting surfaces with a washcoat, possibly containing catalytic metals. In this application, the term "unfinished" ceramic structure refers to any precursor to a finished ceramic structure, including a dried green body or an unfired or partially fired green body.

Unfortunately, due to the thinness of the outer skin and the inner cell-forming webs, the substantial thermal stresses that the unfinished ceramic structures undergo during the firing processes, and the necessary mechanical handling of the green and fired bodies during the manufacturing process, defects such as internal cracks and voids may occur, as well as separations between the outer skin and the inner matrix of webs. Additionally, upsets due to raw material deviations from specifications may also occur possibly leading to property variations. To reduce the occurrence of such defects, it would be desirable to have a quality control procedure which allowed the manufacturer to reliably trace any defective ceramic honeycomb structure back to the specific factory, kiln, and batch that it originated from and to other processing steps undertaken. Such a procedure would allow the manufacturer to review the particular manufacturing parameters used to fabricate the defective unit and to modify its manufacturing operation in order to reduce the occurrence of such defects in future articles. Accordingly, it is a known procedure to mark, after the final firing or heating step, finished ceramic honeycomb structures with marks containing manufacturing information so that remedial manufacturing operations may be implemented.

Unfortunately, the applicants have observed that such a marking procedure does not reliably result in an accurate recovery of the manufacturing information associated with a particular ceramic honeycomb structure. In particular, the applicants have observed that subsequent to the manufacture of the green bodies of such structures, different batches of green bodies from different kilns may become mixed together in order to efficiently implement other stages of the fabrication process. Hence a quality control process where manufacturing information is printed on the finished ceramic honeycomb structures may not accurately reflect the actual manufacturing conditions and history of the structures, i.e., reliable traceability is not achievable.

To avoid the aforementioned problems, it is necessary to print a data carrying mark on the skin of the green bodies that ultimately form finished completed ceramic honeycomb structures. However, there are a number of problems associated with implementing such a method due to both the fragility of the green bodies, the high temperatures they are subjected to during the firing process, the speed with which they must be marked in order to avoid a production bottleneck, and the tendency of some inks to run or blur when printed on the green body, or to degrade or react with the unfired material forming the skin of the green body.

Accordingly, there is a need for a system and method for printing a data-carrying mark on the skin of a green ceramic honeycomb structure which does not apply potentially damaging pressure on the thin sidewalls of such structures, and which is capable of withstanding the firing temperatures at or above 800° C., at or above 1100° C., or even at or above 1300° C. Ideally, such a method would be capable of printing a unique mark on each one of a particular batch of green ceramic structures, so that the manufacturing history of each particular ceramic honeycomb structure (such as date of manufacture, specific factory, kiln and batch) can be accurately traced. It would be desirable if the information contained in the resulting mark would be maintained even if a portion of the mark were obliterated during the use of the ceramic honeycomb structure.

Such a marking system and method should be rapid and reliable and compatible with high-speed manufacturing techniques so as not to create an expensive production bottleneck. The ink used to form the mark should be nontoxic, and able to survive firing temperatures of at least 800° C., or even 1100° C. or more, or even 1300° C. or more, and be chemically compatible with the unfired ceramic material forming the body. The ink should not blur or run when printed, and it should have similar thermal expansion and contraction properties so as to create a clear mark that does not crack or peel during the firing and cooling steps of manufacture, and does not create excessive thermal stresses. Finally, the ink should not degrade or react with the ceramic material forming the wall of the structure during any phase of the manufacturing process, and should visibly contrast not only against the fired ceramic material forming the finished structure, but also against any catalytic washcoat applied to the structure.

SUMMARY OF THE INVENTION

Generally speaking, in one aspect, the invention is both a system and a method for printing a data carrying mark on an unfinished green ceramic honeycomb structure that overcomes the aforementioned shortcomings associated with the prior art. To this end, the system includes a printer for printing a selected, data carrying mark on a wall of a structure, such as a unfinished ceramic honeycomb, with a heat resistant ink; a reader for determining if the data carried on the actual mark printed on the structure by the print head conforms to the data carried within the selected mark, and a moving assembly for generating sequential movement between the wall of the structure to be printed and the print head and the reader, respectively.

Preferably, the printed mark is in the form of a bar code, such as a two-dimensional data matrix barcode that includes unique manufacturing information relating to the specific ceramic structure that it is printed on. Such manufacturing information may be selected from the group consisting of: the identification of the specific factory of origin, identification of the specific kiln used, identification of the specific batch number, identification of the specific date of green body manufacture, and a unique individual identification number. Such a unique barcode is preferably printed on each ceramic honeycomb structure. The use of a two dimensional matrix bar code provides a robust record of the information contained within the mark. In particular, as much as 30% of the mark can be obliterated without loss of information. In addition to the machine-readable bar code, such as the two-dimensional data matrix, the mark preferably also includes a human-readable data string, such as an alphanumeric, to facilitate extraction of the data when a bar code reader is not available.

In order to avoid potentially-damaging thermal stresses, the heat-resistant ink utilized by the printer preferably has a co-efficient of thermal expansion that is substantially the same as that of the wall upon which the mark is printed. Moreover, the thickness of the printed mark is preferably no more than about 50% of the thickness of the wall of the ceramic honeycomb structure, and more preferably less than 35%. The ink is preferably heat resistant to at least about 800° C. to be able to withstand a secondary firing of the green body which may occur, for example, during a calcining step, or even heat resistant to at least about 1100° C. or more, or even 1300° C. or more, or even 1100° C. to 1450° C. so as to be able to withstand the primary firing step that converts the green body into a ceramic structure. Withstanding these temperatures means that the mark has suitable remaining contract with the background surface such that it may still be read.

To these ends, in accordance with another aspect of the invention, the pigment composition of the ink may be a mixture of particulate glass or glass ceramic frit and a metal oxide. The frit and the metal oxide may have an average diameter of between 5 µm and 20 µm, or even between 10 µm and about 20 µm. The metal oxide colorant may be a separate, particulate compound physically mixed with the particulate frit, or it may be melted into the particulate frit. The frit composition for both approaches may be comprised substantially of silica and alumina, along with one or more metal oxides. The metal oxides may be selected from the group consisting of CaO, BaO, $B_2O_3$, ZnO, $ZrO_2$, MgO, $K_2O$, $Na_2O$, $Li_2O$, SrO and $TiO_2$. The colorant compositions may include $Fe_2O_3$, $Co_3O_4$, $CU_2O$, CaO, $MnO_2$ and NiO. The liquid component of the ink may be an organic solvent in order to avoid blurring or running which would otherwise occur if the liquid component were water. For example, pine oil may be used.

To counteract the tendency of the frit-based pigment to settle in the liquid component, the printer system may include an agitating mechanism to agitate the particles in order to keep the particles of pigment more uniformly in suspension during the printing operation. The printer may include an ink jet print head that advantageously avoids the application of pressure on the side of the green ceramic honeycomb structure that would otherwise occur if a contact printer were used. The ink jet printhead preferable includes at least two nozzles to expedite the printing of the work. The nozzles are dimensioned to freely pass the relatively large particles of pigment and glass frit without clogging.

The reader may be an optical reader capable of reading both the machine-readable data in the two-dimensional data matrix barcode, and the human-readable data string. The optical reader may include a camera connected to a programmable logic controller which compares the data read in the actual printed mark with the data carried by the selected mark to determine whether the data carried in the printed mark is the same as the data carried in the selected mark. The optical reader may further have a noise-detection capability to determine the overall quality of the printed mark. The optical reader is connected to a programmable logic controller that decides, based on the output of the optical reader, whether the printed mark rejected in cases where either the read data is incomplete or inaccurate, or the noise component in the mark exceeds a certain pre-selected level. In such cases, the mark is deemed as "defective."

In another aspect of the invention, the system and method may also include a bar code removal and/or covering station for removing and/or covering a defective bar code that has been rejected by the optical reader and programmable logic controller. According to embodiments of the invention, a method is provided for repairing an applied bar code on a honeycomb structure, comprising the steps of providing a ceramic honeycomb structure having a defective bar code marked on a surface thereof, and covering the location of the barcode with a layer of covering material. The covering material may be any material that effectively covers the defective mark, such as ceramic cement or a titanium dioxide-containing material. In certain embodiments, prior to the step of covering, and in a removing step, the bar code mark is at least partially removing by abrasion.

For example, a sander may contact the mark to lightly abrading the defective mark off from, or at least partially of from, the wall of the green body. After mark partial or complete removal, an optional cement applicator step may be employed for applying a layer of ceramic cement over the shallow depression in the wall caused by the removal sanding operation. The cement application may be by a spray cement applicator, or an application and doctor blade step. Upon completion of the removal step, the mark is rendered unreadable and can no longer be seen. After the step of covering is completed, the bar code mark may be re-applied elsewhere on the honeycomb structure.

The moving assembly may include a turntable for rotating the given body relative to the printer and the reader, which remain stationary, as well as a template that facilitates positioning of the green body on the turntable so that the wall of the structure to be printed moves to within a selected distance of both the print head and the reader.

Finally, the system may include a dryer for drying the mark after it is printed on a wall of the ceramic honeycomb structure. The dryer may be, for example, a hot air blower or a heating element that radiates infrared radiation onto the mark.

In operation, an operator first positions a green or finished ceramic structure on the turntable of the moving assembly via the positioning template. The print head of the printer then prints a pre-selected, data-carrying mark on the wall of the honeycomb structure. The turntable then rotates the freshly-printed mark in front of the dryer. After the mark is dried, the turntable then rotates the mark in front of the optical reader, which in combination with the programmable logic controller determines the integrity and quality of the printed mark, and decides whether or not the printed mark is to be accepted or rejected. The entire marking operation requires only a few seconds to implement. If the mark is rejected, it may be removed and/or covered by the process described above, and then re-marked.

According to additional embodiments of the invention, a method for marking an unfinished ceramic structure is provided, comprising the steps of selecting a data carrying mark including manufacturing information to be printed on said ceramic structure; printing said selected mark onto a wall of an unfinished version of the ceramic structure with a heat resistant ink; firing said unfinished ceramic structure incident to converting the unfinished structure into the finished ceramic structure, and reading the printed mark after the firing step to determine if the data carried in said printed mark conforms to the data carried in the selected mark.

According to yet further embodiments of the invention, a method for marking a structure, comprising the steps of selecting a green body which, when fired, becomes a ceramic structure, selecting a data carrying mark including manufacturing information to be printed on the structure, printing the data carrying mark on the green body in a heat resistant ink capable of withstanding firing temperatures which convert the green body into a ceramic structure, and firing said green body into the ceramic structure.

In an additional aspect of the invention, a method for marking a ceramic honeycomb structure is provided, comprising the steps of forming (such as by printing) a bar code onto an unfinished ceramic honeycomb structure with a heat resistant ink, and firing the unfinished ceramic honeycomb structure to convert the unfinished ceramic honeycomb structure into the ceramic honeycomb structure wherein the bar code is machine readable after the step of firing. In addition to the bar code, a unique individual identifying mark, such as an alphanumeric human-readable data string may also be applied with heat resistant ink alongside the barcode.

According to additional embodiments of the invention, a heat resistant ink is provided comprising a particulate glass or glass ceramic flit and colorant. The colorant may be a particulate and may be intimately mixed with said particulate frit. Optionally, the colorant may be melted into said particulate flit. The glass or glass ceramic frit may be substantially comprised of silica and alumina, and at least one selected from a group consisting of CaO, BaO, $B_2O_3$, ZnO, $ZrO_2$, MgO, $K_2O$, $Na_2O$, $Li_2O$, SrO, and $TiO_2$. In one implementation, the frit essentially consists of silica, alumina and CaO. The colorant may consist of $Fe_2O_3$, $Co_3O_4$, CuO, $CU_2O$, and NiO.

Additionally, the invention is directed to various marked green and fired honeycomb structures. In one embodiment, the invention is a green honeycomb structure comprising a honeycomb green body having a bar code printed in a heat resistant ink on a surface thereof. In another embodiment, the invention is a ceramic honeycomb structure, comprising a ceramic honeycomb body having a fired bar code thereon. In yet another embodiment, the invention is a ceramic honeycomb structure, comprising a ceramic honeycomb body having a unique individual identifying mark formed thereon. The unique individual identifying mark may be alphanumeric, and may include information concerning a manufacturing date, manufacturing location, and individual number of the honeycomb manufactured on that date. This enables direct traceability to the materials and processes used to manufacture individual honeycombs. According to another embodiment of the invention, a ceramic honeycomb structure is provided, comprising a ceramic honeycomb body having marked thereon a combination of a two-dimensional bar code alongside a unique individual human-readable data string.

DETAILED DESCRIPTION OF THE PREFERRED EMBODIMENT

Figure 1A:
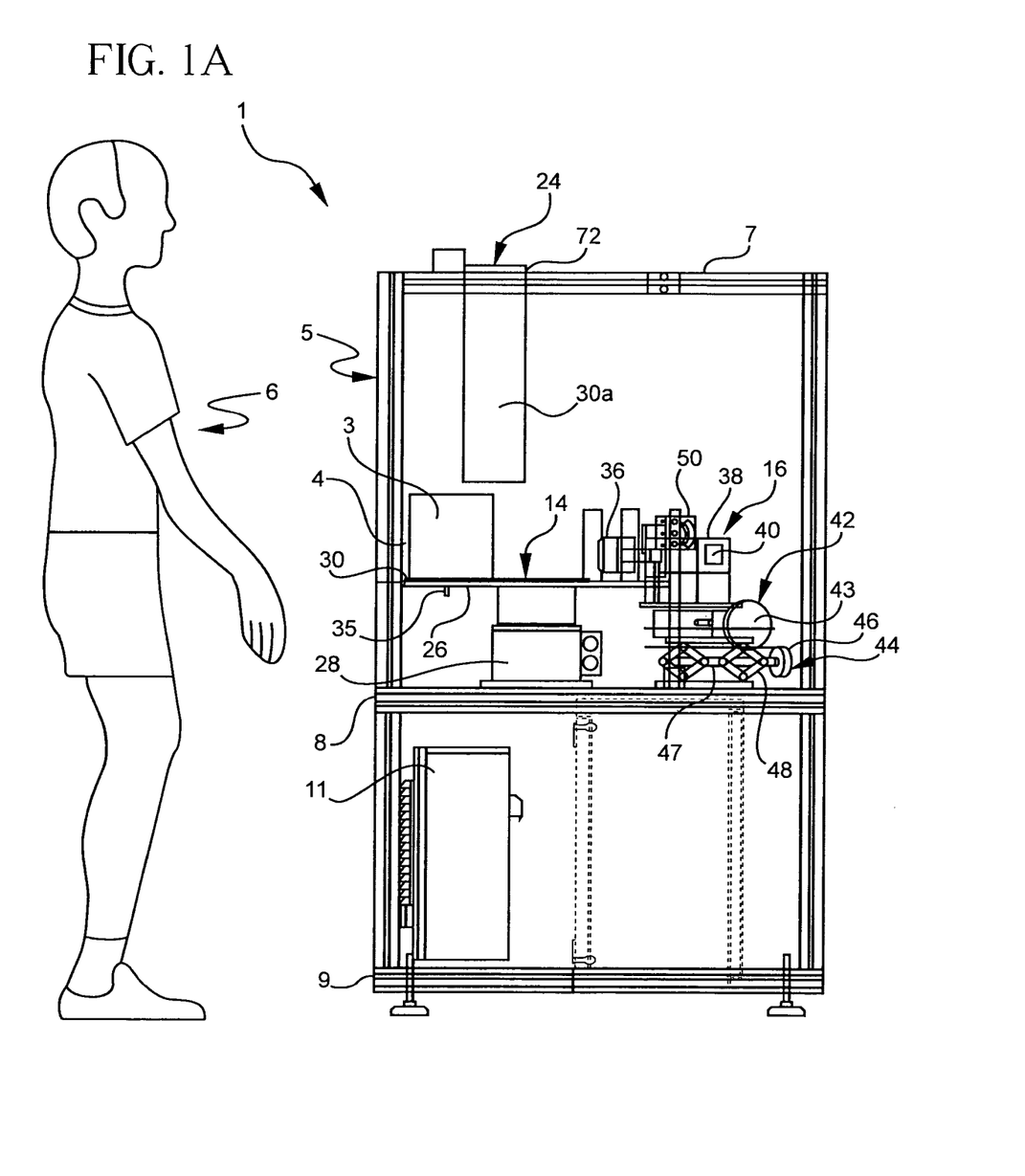
FIG. 1A is a side view of a marking station that forms the system of the invention.
Figure 1B:
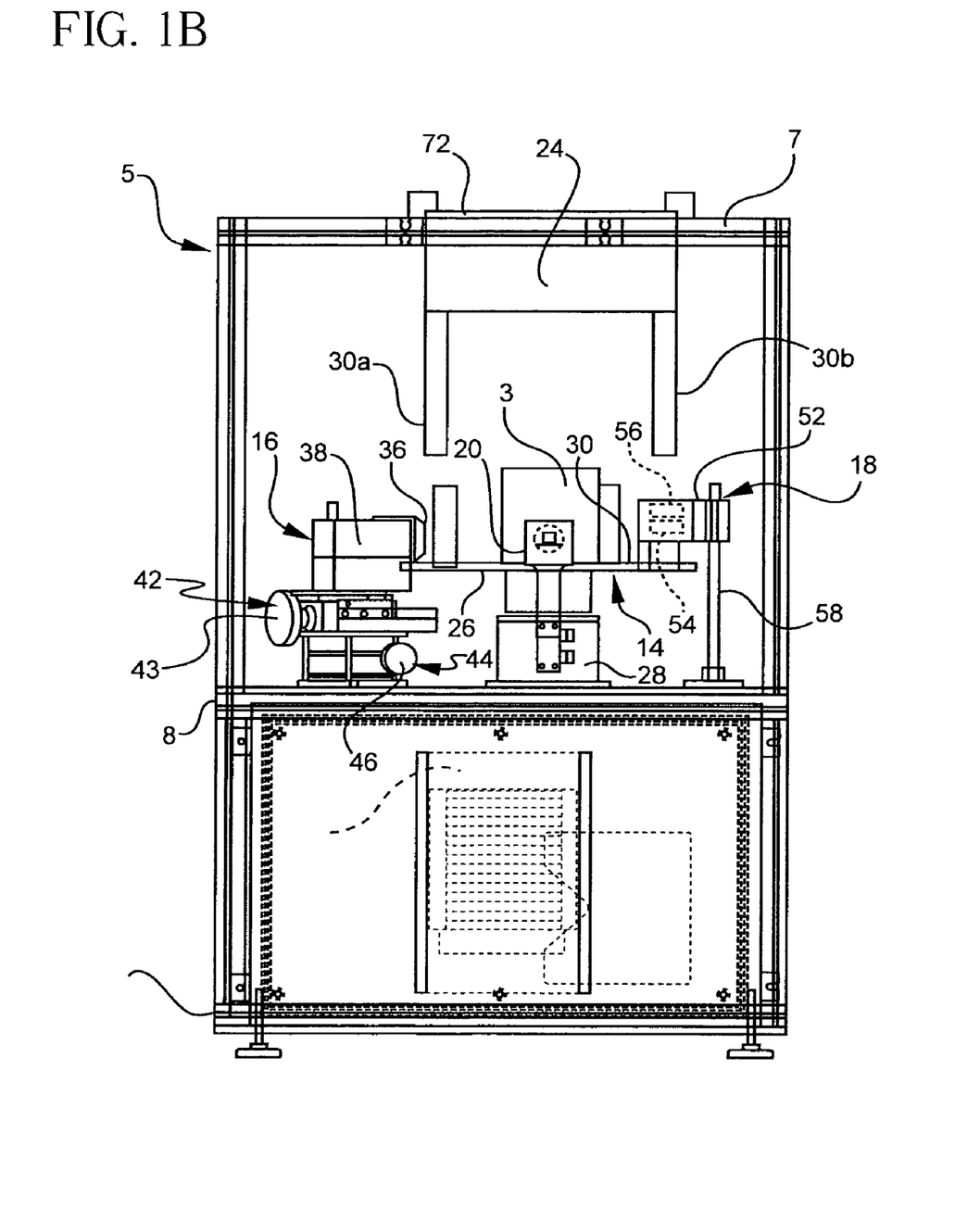
FIG. 1B is a back view of the station illustrated in FIG. 1A.

With reference now to FIGS. 1A and 1B, wherein like numerals designate like components throughout all the several figures, the system 1 for marking green body or otherwise unfinished ceramic structure 3 of a ceramic honeycomb structure generally comprises a marking station 5, and a station worker 6 for loading and unloading the green body 3. The marking station 5 includes an upper frame 7, an upper shelf 8, and a lower shelf 9. The lower shelf 9 supports a programmable logic controller 11 which controls the operation of the various components mounted on the upper shelf 8. The upper shelf 8 supports a moving assembly 14, a printer 16 for printing a data-carrying mark on the green body 3, an optical reader 18 for reading and determining the overall equality of the printed mark, a dryer 20 for drying the ink that forms the mark, and a bar code removing assembly 22 (shown in FIGS. 2-5) for removing and covering defectively-printed marks from the green body 3. Each of these principal components of the station 5 will now be described in more detail.

The moving assembly 14 includes a turntable 26 rotatably mounted on a driver 28. Although not specifically shown in the drawings, the driver 28 is formed from a combination of a step servo motor whose output is connected to the rotatably mounted turntable 26 via a drive train. The step servo motor of the driver 28 is connected to a power source (also not shown) which in turn is controlled by the programmable lodge controller 11. The controller 11 controls the specific angle that the turntable 26 rotates by controlling the number of power pulses conducted to the step servo motor in a manner well known in the digital control arts. The moving assembly 14 further includes a template 30 formed from a plate 32 that lies on top of the turntable 26. The plate 32 has a recess 34 which is complementary in shape to the bottom edges of a particular model of green ceramic honeycomb structure. The template 30 includes a set of pins 35 (only one of which is shown) that position the plate 32 in proper alignment with the top surface of the turntable 26. While the template 30 has been referred to thus far in singular terms, the system 1 of the invention actually includes a plurality of templates 30 (shown in FIGS.

2-5), each of which has a recess 34 that corresponds to a different sized green honeycomb ceramic body 3. All of these templates 30 serve to position their respective green bodies 3 such that an outer wall 4 of the body 3 is tangent with the outer periphery of the turntable 26. Such positioning insures that the printer 16 and optical reader 18 will be spaced a proper distance from the outer sidewall 4 of the green ceramic body 3, regardless of the particular size of green body 3 being marked in the system 1.

The printer 16 includes an ink jet print head 36 which preferably has at least two ink jets (not shown) so as to be able to expeditiously print a mark containing the combination of a bar code, such as a two dimensional bar code, and a human-readable alphanumeric data string. Printer 16 is provided with an ink reservoir 38 for storing a heat resistive ink which is preferably comprised of a mixture of a particulate glass or glass ceramic frit and a metal oxide colorant in combination with an organic liquid, such as pine oil. The particulate glass or glass ceramic frit may be intimately mixed with particles of the metal oxide colorant (hereinafter referred to as "Approach No. 1") or the colorant may be melted directly into the glass or glass ceramic frit prior to the application of the resulting ink to the ceramic marine body (hereinafter referred to as "Approach No. 2"). Examples of glass compositions suitable for an Approach No. 1 type ink are set forth in Table 1 below:

TABLE 1

Examples of Frit Compositions - Approach No. 1:

| | Glass No.: | | | | | | | | | | | | |
|---|---|---|---|---|---|---|---|---|---|---|---|---|---|
| | 1 | | 2 | | 3 | | 4 | | 5 | | 6 | | 7 |
| Composition (mole %) | $K_2O$ | 8.1 | $K_2O$ | 8.1 | $K_2O$ | 8.1 | CaO | 22.3 | MgO | 13.0 | $Li_2O$ | 4.0 | $Na_2O$ | 0.4 |
| | $Na_2O$ | 8.1 | BaO | 12.8 | MgO | 4.8 | $B_2O_3$ | 5.9 | BaO | 1.6 | CaO | 7.0 | $K_2O$ | 7.4 |
| | ZnO | 15.4 | $B_2O_3$ | 1.2 | CaO | 11.9 | $Al_2O_3$ | 25.6 | ZnO | 4.9 | SrO | 18.0 | MgO | 2.5 |
| | $Al_2O_3$ | 1.3 | $Al_2O_3$ | 18.4 | $Al_2O_3$ | 20.3 | $ZrO_2$ | 1.7 | $Al_2O_3$ | 19.5 | $Al_2O_3$ | 3.0 | $Al_2O_3$ | 2.4 |
| | $ZrO_2$ | 2.9 | $ZrO_2$ | 2.0 | $ZrO_2$ | 1.7 | $SiO_2$ | 44.7 | $SiO_2$ | 61.0 | $B_2O_3$ | 10.0 | $TiO_2$ | 0.3 |
| | $SiO_2$ | 64.3 | $SiO_2$ | 59.1 | $SiO_2$ | 57.6 | | | | | $SiO_2$ | 58.0 | $SiO_2$ | 77.1 |

(mole %)

The above mixtures may be prepared by weighing separately the several powdered constituents, adding them to a polycarbonate bottle with some alumina grinding balls, rolling the mixture on low speed for approximately 15 minutes to achieve homogeneity, and then finally sieving the mixture through a 200 mesh screen to separate the grinding balls and to break up any soft agglomerates. Colorant compositions which may be mixed with above glasses in order to form an ink composition include $Fe_2O_3$, $MnO_2$, $Co_3O_4$, NiO, and copper oxide (either $Cu_2O$ and CuO). Examples of frit/colorant ink compositions are set forth in Table 2 below:

TABLE 2

Examples of Frit/Colorant Ink Compositions. Approach No. 1:

| | Ink Composition No: | | | |
|---|---|---|---|---|
| | 1 | 2 | 3 | 4 |
| Glass No. 1 | 50 | 50 | 30 | 30 |
| $Fe_2O_3$ | 50 | 0 | 70 | 0 |
| $MnO_2$ | 0 | 50 | 0 | 70 |
| Results (fired on AC cordierite, 1300° C. - 4 hr) | | | | |

TABLE 2-continued

Examples of Frit/Colorant Ink Compositions. Approach No. 1:

| | Ink Composition No: | | | |
|---|---|---|---|---|
| | 5 | 6 | 7 | 8 |
| Glass No. 2 | 20 | 0 | 0 | 80 |
| Glass No. 6 | 0 | 20 | 0 | 0 |
| Glass No. 7 | 0 | 0 | 20 | 0 |
| $CO_3O_4$ | 80 | 80 | 80 | 20 |

| | Ink Composition No: | | | | |
|---|---|---|---|---|---|
| | 9 | 10 | 11 | 12 | 13 |
| Glass No. 4 | 80 | 80 | 80 | 80 | 80 |
| $Fe_2O_3$ | 0 | 20 | 0 | 0 | 0 |
| $Cu_2O$ | 0 | 0 | 20 | 0 | 0 |
| CuO | 0 | 0 | 0 | 20 | 0 |
| NiO | 0 | 0 | 0 | 0 | 20 |
| $CO_3O_4$ | 20 | 0 | 0 | 0 | |

TABLE 2-continued

Examples of Frit/Colorant Ink Compositions. Approach No. 1:

| | Ink Composition No: | |
|---|---|---|
| | 14 | 15 |
| Glass No. 5 | 80 | 80 |
| $CO_3O_4$ | 20 | — |
| $Fe_2O_3$ | — | 20 |

(weight %)

Of all the glass compositions set forth in Table No. 1, the inventors found that Example 4 was more preferred, as very little chemical reactivity in the form of corrosion or chemical attack was observed between the composition of Example 4 and cordierite and AT, which are the most common ceramic compositions used to form honeycomb structures. Additionally, when this particular glass composition is mixed with iron oxide ($Fe_2O_3$) in 80-20 weight percentages as is illustrated in ink composition No. 10 in Table 2, the resulting ink exhibits good color stability as well as little reactivity with cordierite and AT. However, composition nos. 14 and 15 are the most preferred, as these compositions exhibit the positive characteristics of no reactivity on cordierite and AT along with good color stability. Hence, ink composition no. 10 is more preferred over compositions 1-9 and 11-13, while ink composition nos. 14 and 15 are the most preferred. Additionally, the applicants have found that all of the composition nos. 10, 14 and 15 are capable of withstanding firing temperature of over 1000° C. The term withstand firing as used herein means that the markings are not obliterated by such firing, and bar code and alphanumeric data string produced thereby are capable of being read by conventional bar code reading equipment after firing.

Table 3 illustrates two examples of frit/colorant ink compositions that utilize approach No. 2. Interestingly, the Ca-alumino-silicate glass composition that forms the frit is related to glass composition No. 4 which in turn forms the basis of the more-preferred Approach 1-type frit/colorant ink composition No. 10 of Table 2.

TABLE 3

Examples of Frit/Colorant Ink Compositions - Approach No. 2

|  | Ink Composition No: | |
|---|---|---|
|  | 14 | 15 |
| CaO | 22.5 | 22.5 |
| $Al_2O_3$ | 22.5 | 22.5 |
| $SiO_2$ | 45 | 45 |
| $Fe_2O_3$ | 10 | 0 |
| $Co_3O_4$ | 0 | 10 |

(mole %)

Additional compositions for Approach 2-type frit/colorant compositions are set forth in the table below:

TABLE 4

Further Frit/Colorant Ink Compositions For Approach No. 2:

| | Ink Comp. No: | | | | | | | | | |
|---|---|---|---|---|---|---|---|---|---|---|
| | 18 | 19 | 20 | 21 | 22 | 23 | 24 | 25 | 26 | 27 |
| CaO | 11.9 | 11.9 | 0 | 0 | 0 | 0 | 0 | 0 | 0 | 0 |
| MgO | 4.8 | 4.8 | 13.0 | 13.0 | 13.3 | 13.3 | 12.9 | 12.9 | 13.2 | 13.2 |
| ZnO | 0 | 0 | 4.9 | 4.9 | 6.7 | 6.7 | 6.5 | 6.5 | 1.7 | 1.7 |
| $K_2O$ | 3.6 | 3.6 | 0 | 0 | 0 | 0 | 0 | 0 | 0 | 0 |
| $Al_2O_3$ | 20.3 | 20.3 | 19.5 | 19.5 | 20.0 | 20.0 | 19.4 | 19.4 | 19.8 | 19.9 |
| $SiO_2$ | 57.6 | 57.6 | 61.0 | 61.0 | 60.0 | 60.0 | 61.2 | 61.2 | 60.3 | 60.3 |
| $Fe_2O_3$ | 10 | 0 | 10 | 0 | 0 | 10 | 0 | 10 | 10 | 0 |
| $Co_3O_4$ | 0 | 10 | 0 | 10 | 10 | 0 | 10 | 0 | 0 | 10 |
| $ZrO_2$ | 1.8 | 1.8 | 1.8 | 1.8 | 0 | 0 | 0 | 0 | 0 | 0 |
| BaO | 0 | 0 | 1.6 | 1.6 | 0 | 0 | 0 | 0 | 5.0 | 5.0 |

(mole %)

Note in particular the similarities of the glass composition components used in Examples 20 and 21 to glass no. 5.

To help prevent settling of the frit and colorant and to avoid clogging of the ink jets, the particulate frit and colorant is preferably ground or otherwise processed to have a mean diameter between 5 and 20 microns, and more preferably between 5 and 10 microns. To further prevent settling of the frit and colorant within the organic solvent, the ink reservoir 38 is provided with an agitator 40 which may take the form, for example, of a vibrator or motor-operated stirring mechanism. The printer 16 further includes a radial distance adjuster 42 having a knob 43 that moves the print head 36 toward and away from the periphery of the turntable 26 by means of a screw mechanism (not shown), as well as a vertical height adjuster 44 for moving the print head 36 up or down by means of a knob 46 attached to a lead screw 47 threaded through a scissors-type linkage 48. Finally, the printer 16 includes a print head attitude adjuster 50 (best seen in FIG. 1A) so that the ink jets within the print head 36 may be oriented orthogonally with respect to the outer wall 4 of the green ceramic body 3 prior to the marking operation.

The optical reader 18 is may be a commercially-available bar code reader having a housing 52 that encloses the combination of a scanning light source 54 and digital imager 56 (both schematically indicated in phantom). The optical reader 18 further includes a vertical and rotary position adjuster 58 for properly positioning the front end of the housing 52 with respect to the marked sidewall 8 of the green body 3. The combination of the light source 54 and digital imager 56 are commercially-available components which, per se, do not constitute the invention. The output of the optical scanner is connected to the programmable logic controller 11.

The dryer 20 is positioned approximately midway between the printer 16 and optical reader 18, and functions to dry the ink that is applied to the side wall 4 of the green body 3 by the ink jet print head 36 of the printer 16. To this end, the dryer 20 includes a housing 61 that encloses an electrically powered, heated air jet 63. Alternatively, the dryer 20 may be comprised of a source of infrared radiation. While the dryer 20 is part of the preferred embodiment of the marking station 5, it should be noted that the dryer 20 of the system 1 (as well as the drying step of the process of the invention) may not be necessary if the heat resistant ink is sufficiently rapidly-drying.

Figure 2:
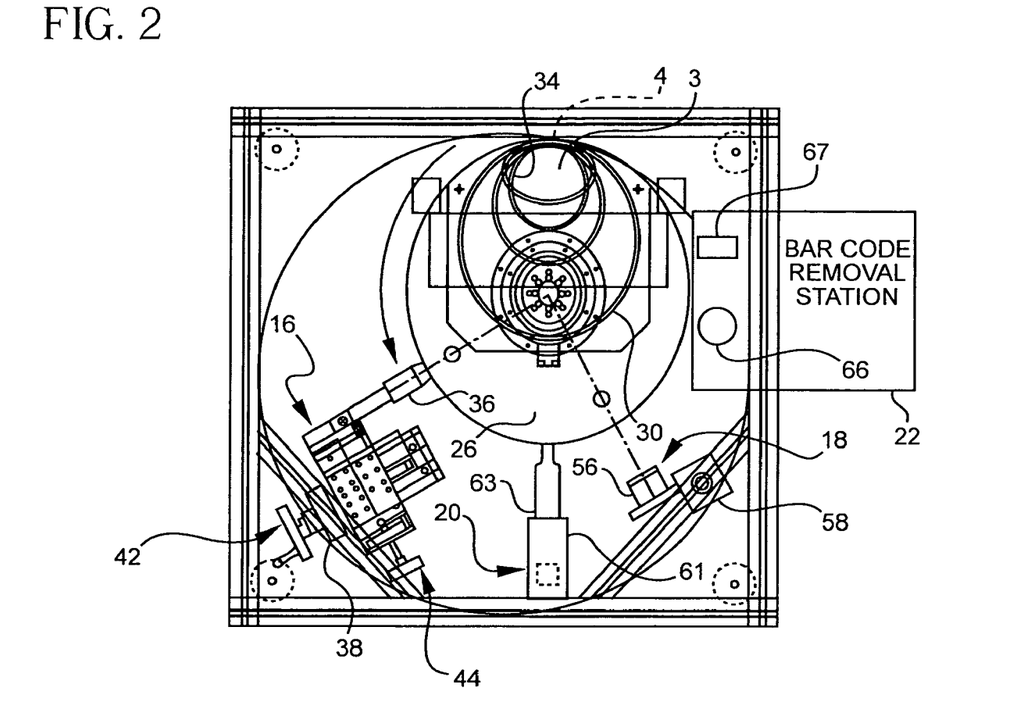
FIGS. 2, 3, 4, and 5 are each plan views of the station illustrated in FIG. 1A, illustrating the first, second, third and fourth steps of the method of the invention, respectively.
Figure 3:
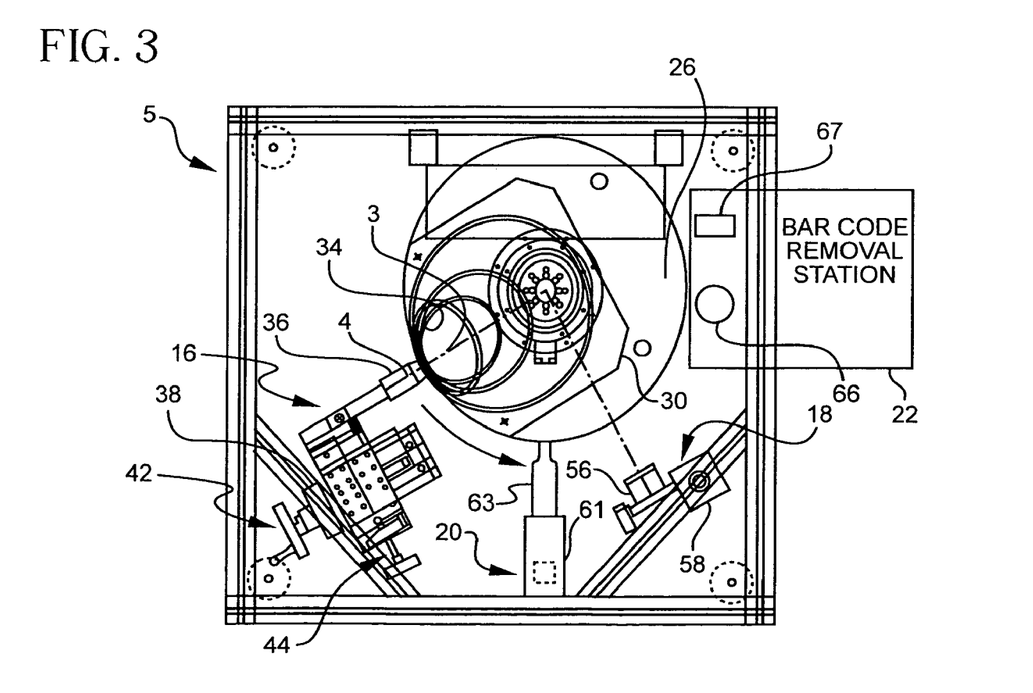
Figure 4:
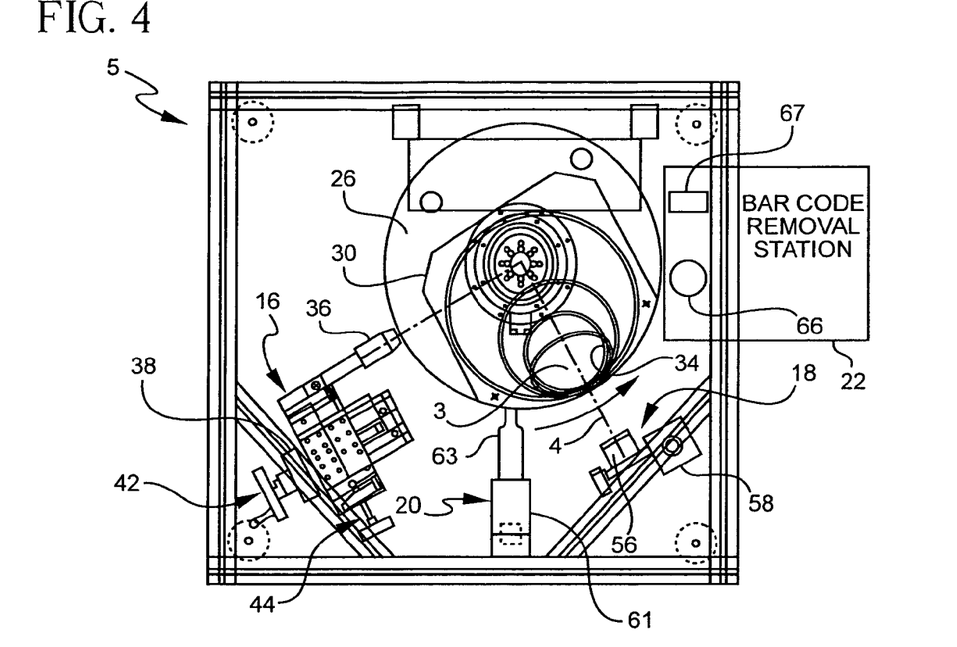

With reference now to FIGS. 2-4, the station 5 also preferably includes a bar code removal assembly 22 which may contain a combination of a sander 66 and a covering applicator which may take the form of a ceramic cement applicator 67. Sander 66 may include the rotatable wheel having a plurality of small segments of an abrasive paper attached around its periphery so as to lightly sand away a defectively applied mark from the relatively thin side wall of the green body 3. The ceramic cement applicator 68 may include a spray head for applying a thin coat of ceramic cement covering that is compatible with the ceramic material that forms the side wall 4 of the green body 3. The compositions of such ceramic cements are well known and are used to secure portions of the outer skin of the green body 3 over the matrix of thin webs contained within the body 3.

Although sanding may be employed, the method may be further accomplished by only covering the mark (e.g., bar code) with any covering material suitable to cover the mark, such as a titanium dioxide-containing cover material. For example, a covering material may be applied, for example, by brush painting, spraying, sponging, rolling, rubbing, or even by crayon application over the mark to effectively cover the mark. Optionally, an ink may be sprayed overtop the mark, for example by an ink jet printer head similar to that employed to produce the mark. This ink jet repair head may be part of the same apparatus and system used for producing the mark. The degree of cover should be sufficient to adequately cover the mark, such that it cannot be easily seen through the repair, or read by bar code reading equipment. The color of the covering material should be the same or similar color as the fired ceramic, if possible. After the step of covering, the mark (e.g., the barcode and/or human-readable data string) may be reapplied. The mark may be reapplied overtop the repair area, after being dried, or applied in a new, undisturbed area of the structure.

Like the previously described moving assembly 14 and optical reader 18, the printer 16, the dryer 20 and the bar code removal and covering station 22 are electrically connected to and controlled by the programmable logic controller 11.

Turning now to the upper frame 7, the lift assistor 69 is formed from a pair of retractable and extendable forks 70a, b which are moveably mounted via a roller assembly 72 onto the frame 7. The entire lift assistor 24 may be vertically moved away from the station 5 via a crane-type mechanism (not shown) in order to pick up and load unmarked green bodies 3 on the moving assembly 14.

The method of the invention is best understood with reference to FIGS. 2-5. In the first step of the method, a template 30 having a recess 34 that is complimentary in shape to the bottom portions of the particular model of green bodies or otherwise unfinished ceramic structure 3 to be marked is selected, and is positioned on top of the turntable 26 via alignment pins 35. Next, the operator 6 moves the previously described lift assistor 24 to a storage area or conveyor belt where unmarked green bodies 3 are stored. The forks 70a, 70b of the assistor 24 are then retracted to gently grasp an unmarked green body, and the assistor 24 is moved via the previously-described crane-type mechanism back to the frame 7 of the station 5 in the position illustrated in FIGS. 1A, 1B. The operator 6 then moves the assistor 24 over the recess 34 in the template 30 lying on top of turntable 26, and releases the forks 70a, 70b while manually supporting the green body 3. Once freed, he manually lowers the green body 3 into the recess 34, thus completing the first step of the method.

With reference now to FIG. 3, the system operator 6 then actuates the programmable logic control 11 which in turn rotates the turntable 26 until the side wall 4 of the green body 3 is directly across from the inkjet print head 36 of the printer 16. The controller actuates the printer 16 to apply a preselected two-dimensional bar code and line of human-readable data on the side wall 4 of the green body 3.

With reference now to FIGS. 3 and 4, the programmable logic controller 11 again actuates the turntable 26 to bring the sidewall 4 of the green body 3 into a position directly adjacent to the dryer 20. The programmable logic controller 11 then automatically actuates the dryer 30 to dry the ink that forms the freshly printed mark on the side wall 4.

With reference now to FIG. 4, the programmable logic controller 11 then turns the turntable 26 such that the sidewall 4 of the green body 3 is directly in front of the optical reader 18. The optical reader 18 scans the mark, and determines whether or not the data contained in the printed mark is the same as the data in the mark selected by the controller 11. If the answer to the inquiry is affirmative, the programmable logic controller 11 then determines the quality of the mark by comparing the actual optical signal strength of the printed mark with an expected optical signal strength of an ideally printed mark. If the printed mark contains all of the data contained in the pre-selected mark, and if the detected signal strength of the printed mark is above a pre-selected threshold (i.e., if the signal to noise ratio of the detected mark is above a preselected threshold) then the mark is accepted. However, if the printed mark fails either of these two tests, it is rejected.

Figure 5:
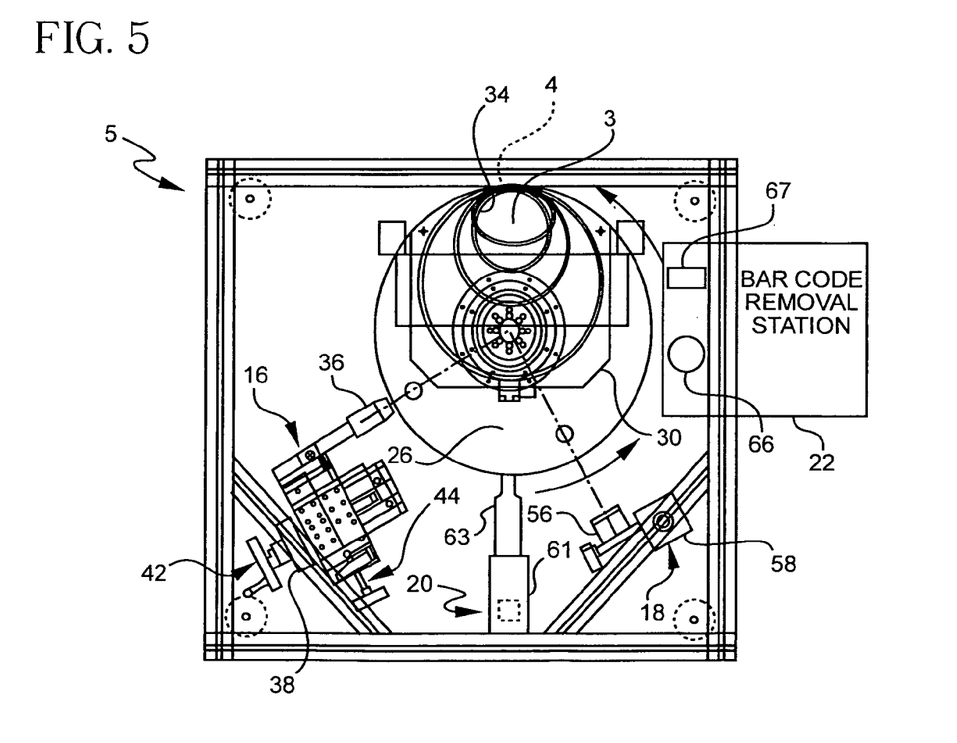

With reference now to FIG. 5, if the printed mark is accepted, the programmable logic controller 11 rotates the turntable 26 such that the green body 3 is restored to its initial position. The system operator 6 then removes it and replaces it with an unmarked green body 3 and repeats the process. However, if the printed mark fails either of the two aforementioned tests, the programmable logic controller 11 actuates the turntable 26 to position the green body 3 in front of the bar code removal and covering station 22. The sander 66 is actuated to gently abrade away the defective mark, and the resulting shallow depression in the outer skin of the ceramic body 3 is filled in via a spray of ceramic cement from the cement applicator 67. The controller 11 then restores the green body 3 to the initial position illustrated in FIG. 5, where the marking process is repeated after the system operator 6 rotates the green body so that, for example, a different portion of the outer wall 4 is adjacent to the outer peripheral of the turntable 26.

Figure 6:
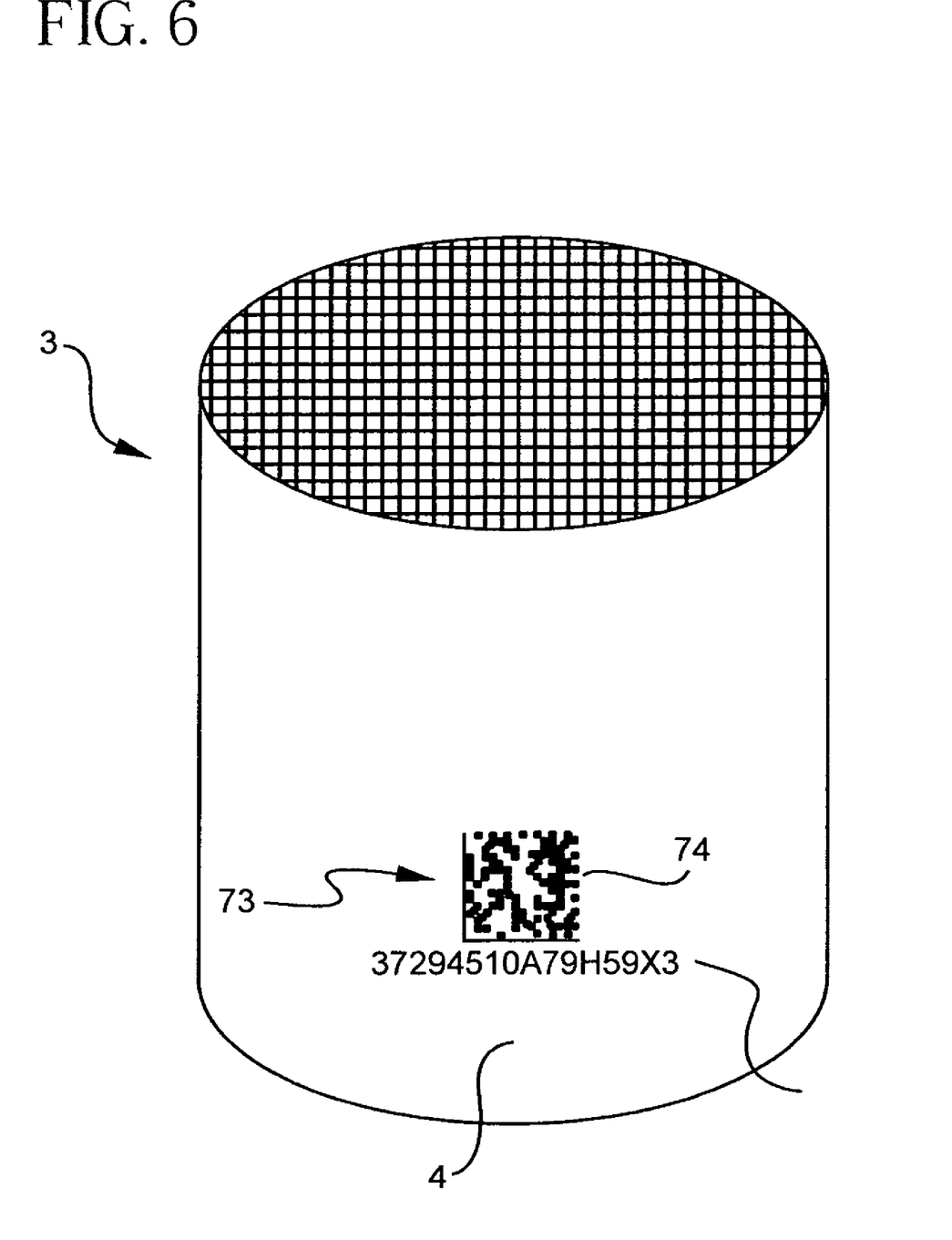
FIG. 6 is a perspective view of a green ceramic honeycomb structure that has been marked with a two-dimensional bar code and a human-readable, alphanumeric data string in accordance with the invention.

FIG. 6 illustrates an example of the data carrying mark 73 that the marking station 5 applies to the side wall 4 of a green body 3. The mark 73 may include a bar code, such as a two-dimensional barcode 74 which preferably contains specific manufacturing information, such information as the specific factory and/or kiln that produced the green body 3, the particular batch that the green body 3 belonged to at the time of production, the date of production, and/or a unique individual identification number or code (no two of which are alike for some significant period of time). In a preferred implementation, the unique individual identifier number or code comprises alphanumeric indicia and is placed alongside the bar code. In one particularly useful embodiment, the alphanumeric indicia includes a first digit or set of digits that uniquely identify the station that placed the mark the honeycomb body, additional digits that identify the date (such as a julien date), and additional digits that identify a sequential number of the honeycomb body manufactured on that date (e.g. number 28 or 1410 manufactured that day). The alphanumeric indicia may be all numbers, all letters, or a combination of numbers and letters. The unique identifier may be further encrypted, by a suitable encryption code to make it difficult for the coded information to be reverse engineered, except by the manufacturer, who of course, holds the key to the encryption code. The unique identifier may be placed on the honeycomb structure at any suitable time in the manufacturing sequence. For example, the mark may be printed on the side wall of the honeycomb just after the drying or cutting steps where a high temperature resistant ink is used that can survive firing, or later, after firing, where a low temperature marking ink is used.

Data for each unique individual identifier code or number assigned and relating to an individual honeycomb is stored in a relational database during the manufacturing sequence and may later be extracted at any time. As such, the origin, manufacturing materials and processes used, and equipment and apparatus used to manufacture the honeycomb, as well as performance, properties, and attributes of the honeycomb may be readily looked up. Accordingly, any defect or variation in the honeycomb may be readily related to the materials, processes, and equipment use. Thus, if desired, changes may be made in the raw materials, processes, etc. to effect changes in properties or attributes.

Such a two-dimensional barcode is preferred, since (due to informational redundancies inherent in such codes) up to 30% of the barcode 74 may be obliterated without any loss of information. Preferably, the mark 73 further include a human readable, alpha numeric data string 75. Such a data string not only provides an additional measure of redundancy in the data incorporated in the mark 73, but further allows a human operator to extract the manufacturing information contained in the mark 73 without a barcode reader.

In one embodiment, the unique individual identification number or code is the same information as is contained in machine readable form in the bar code. The unique identifier information is generated by a computer program that ensures that the number or code is unique to that honeycomb, and that honeycomb alone, for significant periods of time, for example, greater than a decade. This allows for traceability of that particular honeycomb to any process it underwent during its manufacture, including traceability to the raw materials used, the specific batches and processes employed, the date of manufacture, specific extruder lines and extrusion dies used, particular kilns and firing cycles, as well as finishing operations employed. The unique identifier numeral or code is placed on the surface of the structure, preferably in the direct vicinity of the bar code, such that both may be read by one reader apparatus.

While this invention has been described with respect to a preferred embodiment, various modifications, additions, and variations will become evident to the persons in the art. All such variations, additions, and modifications are encompassed within the scope of this invention, which is limited only by the appended claims, and the equivalents thereto.

What is claimed is:

1. A heat resistant ink comprising a particulate glass or glass ceramic frit and colorant, wherein said glass or glass ceramic frit is comprised substantially of silica and alumina, and is free of oxides of K, Li, and Na, wherein a bar code mark applied to a green ceramic body with the ink is capable of being read by a bar code reader after the green ceramic body is fired into a ceramic structure at a temperature of at least 1300° C.

2. The heat resistant ink of claim 1, wherein said colorant is particulate and is intimately mixed with said particulate frit.

3. The heat resistant ink of claim 1, wherein said colorant is melted into said particulate frit.

4. The heat resistant ink of claim 1, wherein said particulate frit and colorant have an average diameter of between about 5 and 20 microns.

5. The heat resistant ink of claim 1, further comprising an organic liquid.

6. The heat resistant ink of claim 5, wherein said organic liquid is pine oil.

7. The heat resistant ink of claim 1, wherein said colorant is one selected form the group consisting of $Fe_2O_3$, $Co_3O_4$, $CuO$, $Cu_2O$, $MnO_2$, and $NiO$.

8. The heat resistant ink of claim 7, wherein said group consists of $Fe_2O_3$ and $Co_3O_4$.

9. The heat resistant ink of claim 1, wherein said frit further comprises at least one selected from the group consisting of CaO, BaO, and MgO.

10. The heat resistant ink of claim 1, wherein said frit is free of $B_2O_3$.

11. The heat resistant ink of claim 1, wherein said frit is comprised of silica, alumina, CaO, and $ZrO_2$.

12. The heat resistant ink of claim 11, wherein said frit further comprises $B_2O_3$.

13. The heat resistant ink of claim 1, wherein said frit is comprised of silica, alumina, MgO, and ZnO.

14. The heat resistant ink of claim 13, wherein said frit further comprises BaO.

15. A heat resistant ink comprising a particulate glass or glass ceramic frit and colorant, wherein said glass or glass ceramic frit is comprised substantially of silica and alumina with at least about 19 mole % alumina, and wherein said glass or glass ceramic frit is free of oxides of K, Li, or Na, wherein a bar code mark applied to a green ceramic body with the ink is capable of being read by a bar code reader after the green ceramic body is fired into a ceramic structure at a temperature of at least 1300° C.

16. The heat resistant ink of claim 15, wherein said frit further comprises at least one selected from the group consisting of CaO and MgO.

17. The heat resistant ink of claim 15, wherein said frit is free of $B_2O_3$.

18. The heat resistant ink of claim 15, wherein said frit is comprised of silica, alumina, CaO, and $ZrO_2$.

19. The heat resistant ink of claim 15, wherein said frit is free of ZnO.

20. The heat resistant ink of claim 15, wherein said frit is comprised of silica, alumina, MgO, and ZnO.

21. The heat resistant ink of claim 20, wherein said frit further comprises BaO.

22. A heat resistant ink comprising a particulate glass or glass ceramic frit and colorant, wherein said glass or glass ceramic frit is comprised substantially of silica and alumina with at least about 19 mole % alumina, and wherein said glass or glass ceramic frit is free of oxides of K, Li, or Na, wherein a bar code mark applied to a green ceramic body with the ink is capable of being read by a bar code reader after the green ceramic body is fired into a cordierite ceramic structure or aluminum titanate ceramic structure at a temperature of at least 1300° C.

23. The heat resistant ink of claim 22, wherein said frit further comprises at least one selected from the group consisting of CaO and MgO.

24. The heat resistant ink of claim 1, wherein said frit contains at least about 19 mole % alumina.

25. A combination of a green ceramic body and a heat resistant ink applied to a surface of the green ceramic body, the ink comprising a particulate glass or glass ceramic frit and colorant, wherein the glass or glass ceramic frit consists of alumina, silica, calcium oxide, boron oxide, and zirconium oxide, wherein the glass or glass ceramic frit is comprised substantially of silica and alumina, with at least about 19 mole % alumina.

26. A combination of a green ceramic body and a heat resistant ink applied to a surface of the green ceramic body, the ink comprising a particulate glass or glass ceramic frit and colorant, wherein the glass or glass ceramic frit consists of alumina, silica, magnesium oxide, barium oxide, and zinc oxide, wherein the glass or glass ceramic frit is comprised substantially of silica and alumina, with at least about 19 mole % alumina.

* * * * *